O. & C. H. SWEET.
Improvement in Cattle-Pokes.
No. 126,239. Patented April 30, 1872.
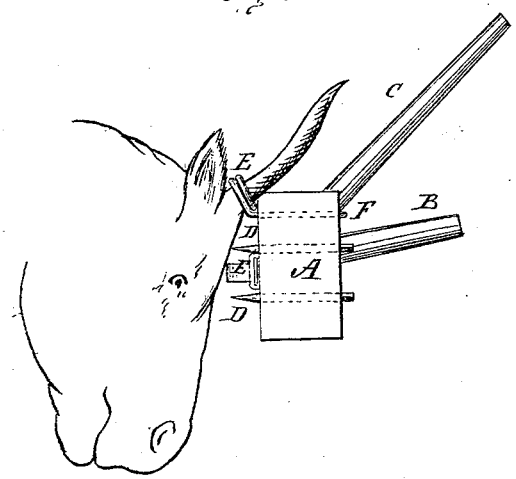
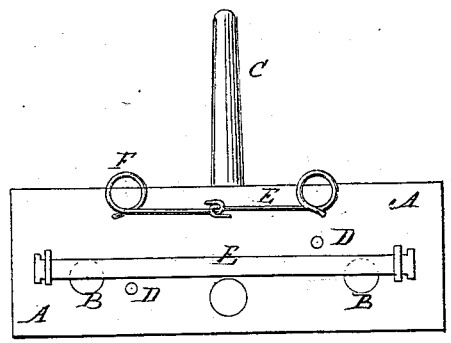
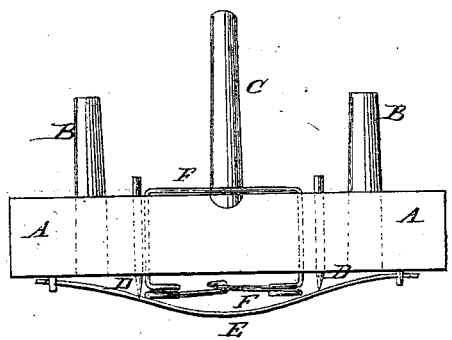
Witnesses:
Chas. Nider
Geo. W. Mabee
Inventor:
O. Sweet
C. H. Sweet
per
Attorneys.

126,239

UNITED STATES PATENT OFFICE.

ORVILLE SWEET AND CLARENCE H. SWEET, OF SOUTH GLEN'S FALLS, N. Y.

IMPROVEMENT IN CATTLE-POKES.

Specification forming part of Letters Patent No. 126,239, dated April 30, 1872.

Specification describing a new and useful Improvement in Cattle-Poke, invented by ORVILLE SWEET and CLARENCE H. SWEET, of South Glen's Falls, in the county of Saratoga and State of New York.

Figure 1 is an end view of our improved cattle-poke. Fig. 2 is a detail view of the rear side of the same. Fig. 3 is a detail view of the upper side of the same.

Similar letters of reference indicate corresponding parts.

Our invention has for its object to furnish an improved poke for cattle to prevent them from running, jumping, hooking, letting down bars, throwing down fences, &c., and which shall be simple in construction, easily applied, effective in operation, and will not hurt or injure the cattle wearing it; and it consists in the construction and combination of the various parts of the poke, as hereinafter described.

A is a block of wood, which may vary in size and weight with the size and strength of the animal that is to wear it. To the forward side of the block A, toward its ends, are attached two pins or prongs, B, which project forward and incline slightly upward, as shown in Figs. 1 and 3, and which are designed to keep the animal wearing the poke from using its horns. To the middle and upper part of the block A is attached a longer pin, C, which projects upward and forward, as shown in Figs. 1, 2, and 3, and which is designed to prevent the animal wearing the poke from getting its head through or under the fence and throwing it down. D are sharp-pointed spikes or pins attached to the middle part of the block A, with their points projecting at the rear side of said block in such positions as to come in contact with the head of the animal wearing the poke should the poke be jolted or should any pressure be applied to it. To the rear side of the block A is attached a spring, E, which rests against the animal's head, and which should have sufficient strength to hold the spikes D away from the animal's head when grazing or walking, but which will yield and allow the spikes D to prick the animal should it attempt to run, jump, or push. F is a wire, the ends of which are passed through the block A, are coiled to form rings to receive the animal's horns, and are then hooked to each other, as shown in Figs. 1, 2, and 3.

The fastening thus constructed cannot injure the animal, and cannot shrink when it becomes wet, while at the same time it holds the poke securely in place.

Having thus described our invention, we claim as new and desire to secure by Letters Patent—

1. The improved cattle-poke, formed by the combination of the block A, pins B and C, pointed spikes or prongs D, spring E, and wire fastening F, with each other, said parts being constructed and operating substantially as herein shown and described, and for the purposes set forth.

2. The wire fastening F, constructed and arranged in connection with the body of a cattle-poke, substantially as herein shown and described, and for the purpose set forth.

ORVILLE SWEET.
CLARENCE H. SWEET.

Witnesses:
LEMUEL BROOKS,
T. A. KIRKHAM.